Patented Sept. 7, 1943

2,328,791

UNITED STATES PATENT OFFICE 2,328,791

CHOCOLATE COMPOSITION AND METHOD OF MAKING

Richard C. Drury, Skokie, Ill., assignor to American Maize-Products Company, a corporation of Maine No Drawing. Application July 1, 1941, Serial No. 400,575

9 Claims. (Cl. 99—23)

This invention relates to chocolate compositions and the method of making them. More particularly, the invention relates to a substantially anhydrous chocolate candy composition including fine particles of sweetening agent of special type and cocoa butter, the cocoa butter extending as a continuous integral mass around and between the particles of sweetening agent, and the composition being characterized by retarded bloom and breaking strength substantially greater than that of comparable compositions including sucrose as the sole sweetening agent.

The invention is useful especially in the making of chocolate coatings for candy and chocolate molded goods such as chocolate bars. The invention will be illustrated in detail, therefore, by description in connection with the making of such coatings and molded goods.

Chocolate coatings and molded products ordinarily contain large proportions of cocoa butter, a crystalline sweetening agent such as sucrose, dextrose or a mixture of the two, and suitable flavoring and coloring materials such as chocolate liquor, vanilla extract, and salt. The chocolate liquor is a standard material in the chocolate art; a common grade contains a large proportion of fat, say about 50% or so, as well as other ingredients which establish color, flavor, and taste characteristics.

In chocolate coatings or molded goods made with the conventional ingredients, especially with sucrose as the sweetening agent, a number of difficulties are encountered. For example, there is a strong likelihood of objectionable graying, i. e. blooming, due to the crystallizing of cocoa butter in visible form on the surface of the composition. Also, the composition may become quite soft at moderately elevated store temperatures, so as to make the candy sticky or subject to deformation of shape.

The present invention comprises the intergrinding in selected proportion, partial fusion, shaping and solidifying of a mixture including cocoa butter, chocolate liquor, and a sweetening agent containing a substantial proportion of dried starch conversion syrup solids, so that the cocoa butter after fusion and subsequent solidification coats the particles of sweetening agent and constitutes an integral shape retaining mass.

There is thus produced a composition having a number of desirable features.

The cocoa butter in the processing comes to extend around the particles of starch conversion syrup solids, as an integral mass that restricts absorption of moisture by the solids even when the composition comes directly into contact with an aqueous solution, as, for instance, when the composition is applied as a coating over an icecream bar or the like.

The composition including the starch conversion syrup solids shows a retardation of the blooming which is a serious objection in many chocolate compositions including sucrose as the sole sweetening agent.

The composition has a relatively flat curve of viscosity as plotted against temperature.

Furthermore, the relatively small variation of viscosity of my composition with temperature changes experienced during the pumping and handling of the composition in its manufacture, minimizes difficulties due to such changes of temperature. Thus, my composition is adapted to be pumped during manufacture through long, small pipes with little danger of the composition becoming so viscous as to interfere with its flowing readily through the line at any point.

In addition, the chocolate compositions including starch conversion syrup solids constituting a substantial proportion of the sweetening agent have much higher breaking strengths than compositions that are otherwise comparable but contain only sucrose as the sweetening agent.

Finally, my compositions are economical in cost per unit of weight, the starch conversion syrup solids have a relatively small effect as compared to the same proportion of sucrose on the flavor and taste characteristics of the chocolate liquor used and the compositions are convenient in manufacture. It is not uncommon in the manufacture of chocolate compositions to find the batch after mixing too low in viscosity. With my compositions it is possible, in case this condition arises, to raise the viscosity to that desired by the incorporation of an additional proportion of the relatively inexpensive starch conversion syrup solids. In fact it is convenient in making my compositions to proportion the materials so that the viscosity expected after mixing may be somewhat less than that desired and to adjust the viscosity finally by adding additional starch conversion syrup solids, instead of operating as previously on the other side, the viscosity after completion of the mixing being lowered if necessary, by the incorporation of an additional amount of relatively expensive cocoa butter.

The sweetening agent used preferably includes sucrose (or a mixture of sucrose and dextrose) with dried starch conversion syrup solids, the proportion of the said solids being suitably in excess of the proportion of sucrose. Retardation of blooming is obtained, for instance, when the sweetening agent includes about 20 to 75 parts or more of dried corn syrup solids to 100 parts of total sweetening agent. Other advantages, such as relative flatness of viscosity curve at working temperatures, are obtained with 8 to 20% of the syrup solids on the weight of total sweetening agent. For some purposes the starch conversion syrup solids may be used as the sole sweetening agent, particularly when the degree of conversion is high, say 45 to 70 D. E.

For some purposes, the corn syrup solids used may be of low degree of conversion, especially when it is desired to decrease the hygroscopicity of the material, when minimized sweetening effect is either desired or satisfactory, and when it is desired to have a particularly high breaking strength of the finished product or a maximum thickening effect from the use of the solids. For such purposes, I may use corn syrup solids of a degree of conversion corresponding to about 20 to 45 D. E. The term D. E. is used herein as an abbreviation for dextrose equivalent by which, in turn, is meant the parts of total reducing sugars calculated as dextrose for 100 parts of the syrup solids.

The starch conversion syrup solids may be obtained in conventional manner, as by converting starch in an acidified aqueous suspension or by a combination of acid and enzyme conversion, refining and evaporating the resulting syrup in any convenient manner to a moisture content below 3%, and then solidifying the concentrated syrup, as by cooling in pans. The syrup thus solidified is finely milled in a usual manner, to give the dried solids suitable for use in my compositions.

I prefer, however, to use corn syrup solids made by concentrating a refined corn syrup and then subjecting the concentrated syrup to spray drying, so as to produce very fine, generally spheroidal, hollow particles that are easily distributed and crushed within the cocoa butter during the mixing operations to be subsequently described.

The term "dried" as applied to the starch conversion syrup solids means sufficiently low in water as to be non-sticky and free-flowing, suitably not substantially above 3% of water. When larger proportions of water are present in the said solids, there is a change in the consistency of the chocolate composition during manufacture, the effect being undesired thickening unless more fat is used to offset the effect. When a large excess of moisture is present, even the use of an increased proportion of the expensive fat does not suffice to correct the difficulty.

The cocoa butter used is conventional for the purpose as is also the chocolate liquor or other flavoring or coloring material incorporated in the chocolate compositions described herein.

When sucrose is used as a part of the sweetening agent it is ordinarily introduced in the form of powdered sugar.

Proportions of total sweetening agent to cocoa butter and other conventional admixes for chocolate coatings and molded products may be about those which are ordinarily used in this art. However, my invention makes possible an increase in the ratio of sweetening agent to cocoa butter, with consequent saving in cost per pound, without sacrificing desired viscosity during mixing and shaping, and with satisfactory firmness of the finished coating or chocolate bar. Thus, I use to advantage 25 to 70 parts of total sweetening agent for 100 parts of the combined weight of sweetening agent, cocoa butter, and chocolate liquor. A particularly satisfactory and economical proportion is about 50 to 70 parts of the sweetening agent including the corn syrup solids to 100 parts of the mixture of sweetening agent, cocoa butter, and chocolate liquor.

Unless otherwise stated, all proportions herein are calculated on the basis of dry weights.

A specific example of the practice of the invention follows.

Chocolate liquor, obtained for example from roasted and blended cocoa beans, sweetening agent consisting of powdered sucrose and corn syrup solids, and a portion of the total cocoa butter to be used are mixed in a machine termed a melangeur. After the mix has been made intimate and uniform, the mix is taken to a refiner, this being a machine with an assembly of metal rolls which are adjusted to a very fine clearance, so that the sugar particles of the mix will be ground extremely fine. The temperature of these rolls varies somewhat according to the practice of the operator.

After the mix has been put through these operations, the particles of sweetening agent are so finely divided that there is not sufficient cocoa butter to cover each individual particle. It is necessary, therefore, to add another portion of the cocoa butter. This is done and the composition again mixed thoroughly, this time suitably in the dough mixer type of machine. When the added cocoa butter has been thoroughly incorporated the product is rerolled, as in a roller mill of the type described above.

The mixture is then removed to processing kettles and as much cocoa butter is added as is necessary to make the mix viscous enough to handle. Further mixing is then effected until distribution of the added cocoa butter is accomplished.

The mix is then transferred to a conching apparatus, a large vessel provided with agitation. The agitation improves the flavor of the chocolate and removes rough edges of sugar particles.

From the conching apparatus the mix is transferred to large processing kettles. Here additional starch conversion syrup solids are added, if necessary to produce a chocolate composition of higher viscosity. In these processing kettles, the temperature of the mixture which as been warmed in the mixing operations described is graduallly reduced, say from approximately 120° F. to about 85°, and then raised to approximately 88° F. The operation is known as tempering and depends upon the type of chocolate being handled and the ultimate results desired in appearance and hardness.

At this temperature, the mixture is filled into molds and then chilled, preferably in air-conditioned equipment. Or, the tempered mixture is warmed and coated upon candy centers, the coated candy being then chilled again in air-conditioned equipment. The product is a chocolate-coated candy ready for packaging and sale.

Compositions molded in small sizes may be sold at retail, as, for example, in the form of small chocolate bars. Larger slabs, such as those weighing ten pounds or so each, are suitable for sale to makers of chocolate products for sale at retail, the slabs being warmed by such makers to form a flowable mass which is then shaped into small bars or applied as a coating to conventional centers for chocolate candy.

In the manufacturing procedure described, various steps may be omitted or altered in accordance with usual practice. Thus, the second rolling may be omitted, or the rolling can be continued for a third time, the choice of process depending upon the fineness to which the sugar is to be ground. The conching procedure, likewise, may be varied, depending upon the quality of chocolate being manufactured. In certain cases, the conching operation is omitted entirely. In other cases, it is carried on for a period as long as six days, when a delicate flavor is desired.

In general, the procedure is standard, except as noted.

The proportions of materials added at various stages in the above procedure are illustrated more specifically by the following data from typical preparations:

Materials added to melangeur:

|  | Parts |
| --- | --- |
| Chocolate liquor of fat content about 52% | 190 |
| Cocoa butter | 20 |
| Powdered cane sugar | 60–180 |
| Corn syrup solids of moisture content less than 3%, to make total sweetening agent 240 parts | 180–60 |
| After first rolling: |  |
| Cocoa butter | 35 |
| In dough mixer: |  |
| Cocoa butter | 45–60 |
| In process kettle: |  |
| Cocoa butter | 0–7 |
| Total cocoa butter used exclusive of fat in chocolate liquor | 105–122 |

The proportion of chocolate liquor may be reduced in my compositions with the production of compositions of lighter color than usual. Thus the amount of chocolate liquor in the above typical preparations may be reduced to as little as about 50 parts. This reduction is made possible because of the decreased masking effect of the corn syrup solids on the flavor of the chocolate, as compared to the effect of an equal amount of sucrose, so that less chocolate liquor is sufficient to give the desired flavor when sucrose is replaced by the corn syrup solids.

On a percentage basis, satisfactory proportions in finished compositions are as follows:

|  | Per cent |
| --- | --- |
| Moisture | 0 to 2.0 |
| Chocolate liquor (52% fat) | 10 to 70 |
| Cocoa butter | 25 to 35 |
| Sucrose | 10 to 30 |
| Starch conversion syrup solids | 15 to 45 |
| Total of sucrose and starch conversion solids | 25 to 70 |
| Total fat (from liquor and cocoa butter) | 30 to 45 |

When either the proportion of chocolate liquor or cocoa butter is near the minima shown in the table, then the proportion of the other must be well above its minimum, so as to keep the total fat approximately within the range shown in the last line of the table.

Vanilla, salt and other usual admixtures are incorporated during compounding, all in accordance with standard technique.

In this manner, there has been produced chocolate bars and chocolate coatings that are smooth in texture; that show practically no objectionable agglomeration or graining of sucrose on standing; that are relatively inexpensive, because of the reduction in the proportion of cocoa butter required and of the substitution of sucrose by less expensive starch conversion syrup solids; that may be made relatively light in color and at the same time without excessive bitterness due to the chocolate liquor used, inasmuch as the proportion of chocolate liquor may be decreased somewhat as the proportion of starch conversion syrup solids in the sweetening agent is increased; and that show a greatly reduced tendency to bloom under conditions of temperature that produce objectionable blooming when sucrose is used as the sole sweetening agent. In a typical test, my improved compositions withstood blooming at 92° F. twice as long as compositions containing sucrose only as the sweetening agent. The compositions also withstood satisfactorily exposure to 85% relative humidity at 85° F. My compositions during manufacture soften to proper consistency for molding and shaping at the same temperature as the conventional mixture containing sucrose as the sole sweetening agent. But in the finished candy, my compositions are firmer than the conventional mixture under usual temperatures of storage and distribution. For equal viscosity at the time of coating centers for chocolate candy, my compositions contain less cocoa butter than required in the usual sucrose compositions.

While the invention has been illustrated by description in connection with the use of corn syrup solids in dried form, it is to be understood that there may be used other starch conversion syrup solids, as for example, the solids obtained from the wet conversion, subsequent refining, concentration, and solidification of the syrup produced by the conversion of starch from Irish or sweet potatoes, wheat, and the like.

Although the invention is not limited to any theory of explanation of the desirable results obtained, it is considered that an important feature is the effect of the soluble dextrine present in the syrup solids made in the wet starch conversion process. This soluble dextrine, present in substantial amount in such syrup solids, exerts a colloidizing or stabilizing effect in the dispersion made during the manufacture of my chocolate compositions.

Another feature is the intimate association in the finished dispersion of the dextrose, maltose, and soluble dextrine of the syrup solids with the cocoa butter, with the production not only of the sweetness desired but also of the desired firmness and reduced tendency to oxidation of the fats of cocoa butter, in the presence of the reducing sugars of the syrup solids.

In determining quantitatively the effect on the breaking strength of chocolate compositions of replacement of sucrose in part by dried corn starch conversion syrup solids, there were first made generally rectangular bars of sloping edges, of average length 49, average width 34, and thickness 6 millimeters. The bars contained 30 parts of chocolate liquor, 25 parts of added cocoa butter, and 45 parts of sweetening agent. The sweetening agent contained various proportions of sucrose and spray-dried corn starch conversion syrup solids. After the bars had been formed and were thoroughly set, they were supported on lines 34 millimeters apart and a force applied by a knife edge along a line half way between the two lines of support. There was then determined the force in grams required to break the bars after exposure for several hours at 76° F. and a relative humidity of about 40 to 55%. The results are as follows:

| Sweetening agent | | Breaking strength |
|---|---|---|
| Sucrose | Corn syrup solids | |
| Per cent | Per cent | Grams |
| 100 | 0 | 2,503 |
| 75 | 25 | 2,810 |
| 50 | 50 | 2,921 |
| 25 | 75 | 3,107 |

The breaking strength rises with the proportion of corn syrup solids. My compositions have more "snap" than comparable compositions that contain sucrose as the sole sweetening agent.

It will be understood that the details given are for the purpose of illustration and that variations within the spirit of the invention are intended to be included within the scope of the appended claims.

What I claim is:

1. A shaped chocolate composition comprising an intimate and substantially uniform mixture containing cocoa butter and sweetening material including fine dried particles of starch conversion syrup solids of reducing sugars content calculated as dextrose of approximately 20 to 70 per cent, the cocoa butter extending as a continuous integral mass around and between the said particles in discrete relationship to each other and protecting them from wetting in moist air, and the said syrup solids constituting not substantially less than 8 per cent of the sweetening material and retarding the blooming of the cocoa butter on the surface of the composition.

2. A shaped chocolate composition comprising an intimate mixture including cocoa butter, flavoring material, and fine particles of sweetening agent in amount to establish the desired sweetness, the sweetening agent including a substantial proportion of starch conversion syrup solids, the total sweetening agent corresponding to about 25 to 70 parts for 100 parts of sweetening agent, cocoa butter, and chocolate liquor, and the cocoa butter forming a continuous solidified mass extending around the individual particles of the sweetening agent so as to restrict the absorption of moisture by the said particles and be stabilized by the particles.

3. A composition as described in claim 2, the sweetening agent including a crystalline sweetening agent and starch conversion syrup solids, the proportion of the said solids being about 8 to 75 parts for 100 parts of total sweetening agent.

4. A shaped chocolate composition comprising an intimate mixture including cocoa butter, chocolate liquor, and fine particles of sweetening agent in amount to establish the desired sweetness, the sweetening agent including a substantial proportion of starch conversion syrup solids of reducing sugars content calculated as dextrose of approximately 20 to 45 per cent, the cocoa butter forming a continuous solidified mass extending around the individual particles of the sweetening agent so as to restrict the absorption of moisture by the particles and said conversion solids having a smaller masking effect than an equal amount of sucrose on the flavor imparted by a given proportion of the chocolate liquor.

5. A composition as described in claim 1, the starch syrup solids corresponding to a conversion of 20 to 45 D. E.

6. Candy comprising the chocolate composition described in claim 4, the proportions of the components being approximately 10 to 70 parts of chocolate liquor, 5 to 35 parts of cocoa butter excluding the fat in the chocolate liquor, and 25 to 70 parts of sweetening agent for 100 parts of the composition, and the sweetening agent including about 8 to 75 parts of starch conversion syrup solids to 100 parts of total sweetening agent.

7. The method of making a chocolate composition, which comprises forming an intimate substantially uniform mixture including cocoa butter and fine dried particles of starch conversion syrup solids of reducing sugars content calculated as dextrose of approximately 20 to 70 per cent and converting the cocoa butter to a continuous integral shaped mass extending around and between the said particles and preventing absorption of moisture by the said particles.

8. The method of making a chocolate composition, which comprises forming an intimate substantially uniform mixture including cocoa butter, chocolate liquor, and fine particles of sweetening agent, the said particles constituting the dispersed phase, warming the mixture to melt the cocoa butter, shaping the warmed mixture, and then cooling the mixture so as to solidify the cocoa butter to a continuous integral shaped mass extending around and between the said particles, the sweetening agent including sucrose and a substantial amount of starch conversion syrup solids of reducing sugars content calculated as dextrose of approximately 20 to 70 per cent and the said solids serving to reduce the proportion of cocoa butter required for a given viscosity during the said warming and shaping steps.

9. The method of making a chocolate composition, which comprises forming an intimate substantially uniform mixture including cocoa butter and fine dried particles of starch conversion syrup solids of reducing sugars content calculated as dextrose of approximately 20 to 70 per cent containing not more than 3 per cent of moisture, so as to avoid objectionable thickening of the chocolate, and converting the cocoa butter to a continuous integral shaped mass extending around and between the said particles and preventing absorption of moisture by the said particles.

RICHARD C. DRURY.